US012589814B2

(12) United States Patent　　　　(10) Patent No.:　US 12,589,814 B2
　　Mottsmith et al.　　　　　　　　　(45) Date of Patent:　　Mar. 31, 2026

(54) AUTOMOTIVE PERFORATED INSULATED GLASS STRUCTURE

(71) Applicant: Tesla, Inc., Palo Alto, CA (US)

(72) Inventors: Rosemary Mottsmith, Palo Alto, CA (US); William S. Sweney, Oakland, CA (US); Christopher R. Conklin, San Francisco, CA (US); HyunJun Shin, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/452,840

(22) Filed: Jun. 26, 2019

(65) Prior Publication Data

US 2020/0001932 A1　　Jan. 2, 2020

Related U.S. Application Data

(60) Provisional application No. 62/690,750, filed on Jun. 27, 2018.

(51) Int. Cl.
　　*B32B 3/26*　　　　(2006.01)
　　*B32B 5/14*　　　　(2006.01)
　　　　　　(Continued)

(52) U.S. Cl.
　　CPC .............. *B62D 29/00* (2013.01); *B32B 3/266* (2013.01); *B32B 5/142* (2013.01); *B32B 7/05* (2019.01);
　　　　　　(Continued)

(58) Field of Classification Search
　　CPC .............. B32B 3/266; B32B 17/10064; B32B 17/10045–10055; B32B 2605/00–18;
　　　　　　(Continued)

(56) References Cited

U.S. PATENT DOCUMENTS 3,831,710 A * 8/1974 Wirt ........................ B32B 27/08
　　　　　　　　　　　　　　　428/116
4,787,296 A * 11/1988 Huang ................... E06B 3/6707
　　　　　　　　　　　　　　　181/289

(Continued)

FOREIGN PATENT DOCUMENTS

CN　　　101634215 A * 7/2010 ............... E06B 7/00
CN　　　108382023 A * 8/2010 ............. B32B 17/00
WO　WO 2008/007447 A1 * 1/2008 ............ E01F 8/0064

OTHER PUBLICATIONS

Gosselin, J.R. and Chen, Q. 2008. "A dual airflow window for indoor air quality improvement and energy conservation in buildings," HVAC&R Research, 14(3), 359-372. (Year: 2008).*

(Continued)

*Primary Examiner* — Frank J Vineis
*Assistant Examiner* — Nicole T Gugliotta
(74) *Attorney, Agent, or Firm* — Schwegman Lundberg & Woessner, P.A.

(57)　　　　　ABSTRACT

A glass structure for a vehicle includes an outer layer of glass and an inner layer of glass. The inner layer of glass is perforated by a plurality of holes and the outer layer of glass and the inner layer of glass are separated by a gap disposed between opposing surfaces of the outer layer of glass and the inner layer of glass. The glass structure provided herein may provide noise absorption and temperature insulation characteristics.

12 Claims, 4 Drawing Sheets

(51) Int. Cl.

| | |
|---|---|
| *B32B 7/05* | (2019.01) |
| *B32B 17/06* | (2006.01) |
| *B32B 25/06* | (2006.01) |
| *B62D 25/06* | (2006.01) |
| *B62D 29/00* | (2006.01) |
| *B62D 29/04* | (2006.01) |

(52) U.S. Cl.
CPC .............. *B32B 17/06* (2013.01); *B62D 25/06* (2013.01); *B32B 2307/102* (2013.01); *B32B 2307/304* (2013.01); *B32B 2605/006* (2013.01); *B32B 2605/08* (2013.01)

(58) Field of Classification Search
CPC ......... B32B 2307/10–102; B32B 17/06–1099; B32B 2307/102; B62D 25/06–07
See application file for complete search history.

(56) References Cited

U.S. PATENT DOCUMENTS 4,953,502 A * 9/1990 Hoover ................ A01K 15/025
119/416

6,820,720 B1 * 11/2004 Nicolai ................... B60R 13/02
181/292
9,378,721 B2 * 6/2016 Zalewski ............. G10K 11/172
2016/0082705 A1 * 3/2016 Fisher .................... B32B 37/14
428/215

OTHER PUBLICATIONS

Glassonweb: https://www.glassonweb.com/article/acoustic-properties-glass-not-so-simple (Year: 2012).*
Computer Snapshot of website "https://www.glassonweb.com/article/acoustic-properties-glass-not-so-simple" (Year: 2012).*
Ex parte Nelson, Appeal 2016-4822, 2017 BL 314681, PTAB (Year: 2016).*
*Datamize, LLC* v. *Plumtree Software, Inc.*, 417 F.3d 1342, 75 U.S.P.Q.2d 1801, 2005 ILRC 2413 (Fed. Cir. 2005), Court Opinion (Year: 2005).*
CN 101634215A, Ma, "Perforated Glass Sheet and Structure Employing the Same," Human Translation (Year: 2010).*
WO 2008/007447 A1, Toru et al., machine translation (Year: 2008).*

* cited by examiner 207
204
201
202
203
205
206
HVAC
208
200

301

302

303

304

305

306

300

AUTOMOTIVE PERFORATED INSULATED GLASS STRUCTURE

CROSS-REFERENCE TO RELATED APPLICATIONS

This application claims priority to U.S. Provisional Application No. 62/690,750, filed Jun. 27, 2018, entitled "Automotive Perforated Insulated Glass Structure," the contents of which are hereby incorporated by reference in their entirety.

BACKGROUND

Technical Field

The present disclosure relates to glass structures for use in vehicles and more particularly to perforated, insulated glass structures for reducing noise and temperature fluctuations.

Description of Related Art

Passenger vehicles such as cars, trucks or the like typically use materials such as steel or aluminum for the body of the vehicle. The inside of the body of the vehicle, e.g., the roof above the driver or passenger compartments, is typically lined with a variety of materials, such as fabric. Such materials are typically selected for aesthetic reasons and also to increase the amount of noise that is absorbed from exterior to the passenger compartment. Such materials may further thermally insulate the inside of the vehicle from temperature fluctuations outside of the vehicle.

SUMMARY

Some vehicles use alternative materials to create the structure or body of the vehicle. For example, vehicles may use glass to create parts of or the entirety of the roof of the vehicle in order to create an interior that feels more open to the outside world. In some instances, it is desirable for glass used in the body of a vehicle to provide noise absorption and temperature insulation characteristics. Thus, the interior of the vehicle will feel more open to the outside world, while providing noise absorption and temperature insulation characteristics.

In some embodiments, a glass structure for a vehicle includes an outer layer of glass and an inner layer of glass, wherein the inner layer of glass is perforated by a plurality of holes and wherein the outer layer of glass and the inner layer of glass are separated by a gap disposed between opposing surfaces of the outer layer of glass and the inner layer of glass. The perforations, layers of glass, and gap between the inner and outer layer may further be tuned for desired noise reduction characteristics, insulations properties, visual appearance, and the like.

Figure 1:
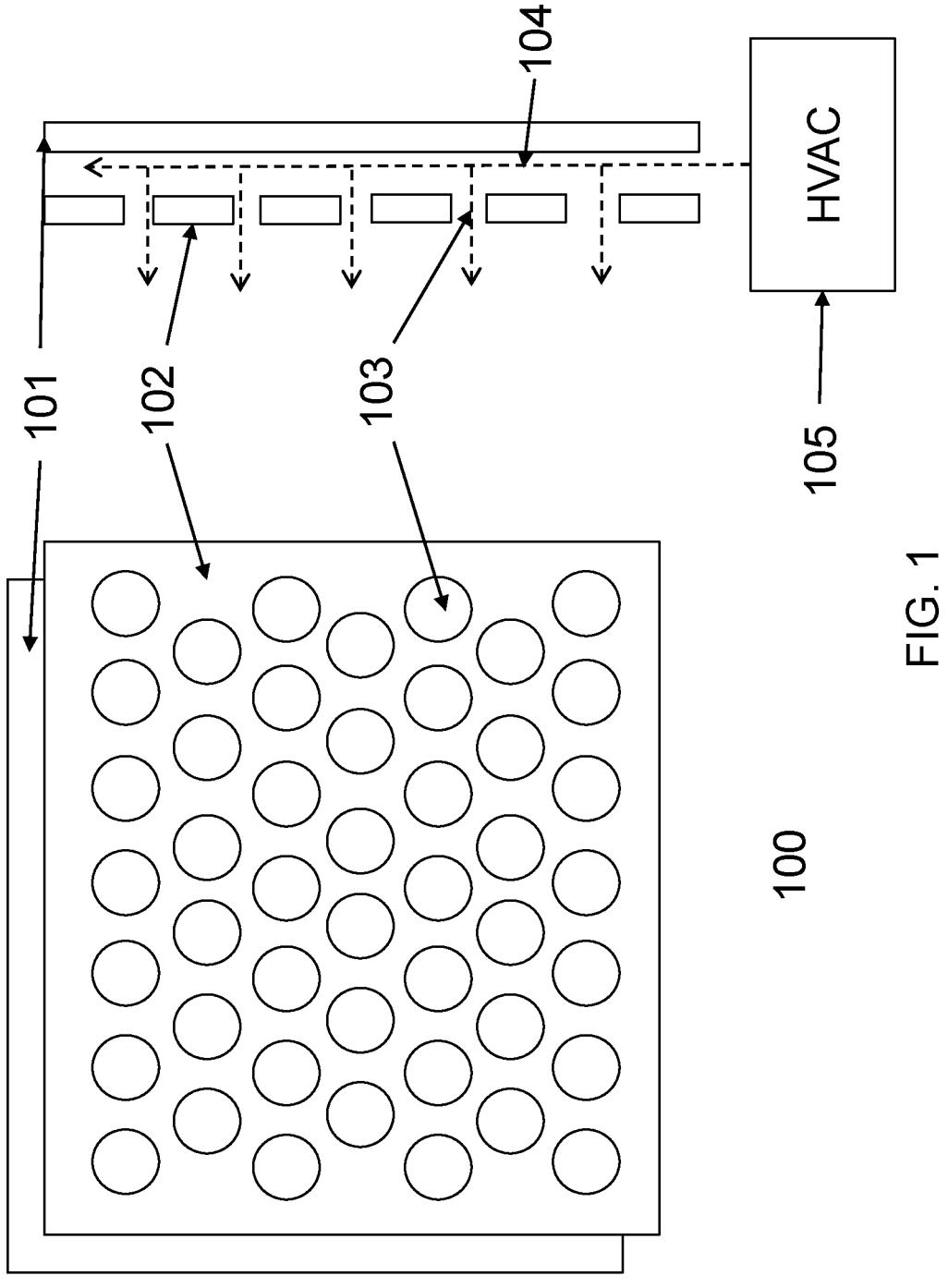
FIG. 1 illustrates an example of the perforated glass structure according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure provides examples of systems and techniques for providing a glass structure (e.g., window) to be used in a vehicle. Exemplary structures disclosed are capable of providing increased noise and temperature management when used in vehicles relative to conventional glass structures (e.g., single or multilayer panes of glass). In one example, the increase in noise and temperature management of the glass structure are provided by perforations in an inside layer of a multi-layer glass structure. The advantages in noise and temperature management allow for the use of glass structures in vehicles that would normally be considered impractical. For example, rather than using glass only in conventional windows, the glass structure as described herein may be used to create the roof of a vehicle. Typically, using glass to create a roof in this manner would result in an increase in noise in the interior of the vehicle while also increasing the need to run HVAC systems due to a higher interior temperature as a result of increased sunlight penetration into the passenger cabin. The glass structure described herein allows for a more pleasant environment for the vehicle occupants, with increased natural light, without the typical drawbacks of increased noise and temperature fluctuations. Accordingly, vehicles seeking to provide a more pleasant and natural occupant environment while reducing noise and the need for strict temperature control can be realized.

Reference will now be made in detail to specific aspects or features, examples of which are illustrated in the accompanying drawings. Like reference numerals refer to corresponding parts throughout the figures.

FIG. 1 illustrates an example of perforated glass structure 100 in an exploded view and side view according to some embodiments. The glass structure 100 includes an outer layer of glass 101 and an inner layer of glass 102. The outer layer of glass 101 may be any type of glass suitable for use in a vehicle. For example, the outer layer of glass 101 may comprise typical glass used in the windshields of vehicles (e.g., annealed soda lime glass). The outer layer of glass 101 may be shatterproof, shatter resistant, or chemically treated to provide increased hardness. The outer layer of glass 101 may also be of any feasible thickness, for example, between 0.55 mm to 5 mm. It should further be understood that the outer layer of glass 101 may include one or more layers or laminations.

The inner layer of glass 102 is perforated by holes 103. The inner layer of glass 102 is between 0.55 mm and 5 mm thick and has a porosity between 1% and 6% due to the perforated holes 103. It should be understood that the porosity is the percentage of the surface area of the inner layer of glass 102 that is made up of the perforated holes 103. The holes 103 are circular in shape and are uniformly distributed across the inner layer of glass 102. In some examples, the holes 103 are a shape other than a circle. For example, the holes 103 may be a square, a rectangle, a trapezoid, or any other conceivable shape. In some examples, the holes 103 are not uniformly distributed across the inner layer of glass 102. For example, the holes 103 may be distributed more densely or only along edge regions of the inner layer of glass 102. In another example, the holes 103 may be distributed in one area of the inner layer of glass 102 (e.g., in one corner of the inner layer of glass 102 or in the center portion of the inner layer of glass 102).

In some examples, the inner layer of glass 102 is made of substantially the same glass as the outer layer of glass 101. For example, the inner layer of glass 102 may have the same chemical composition, strength, thickness, etc. as the outer layer of glass 101. In some examples, the inner layer of glass 102 is made of glass that is different from the outer layer of glass 101. For example, the inner layer of glass 102 may be thinner or thicker than the outer layer of glass 101. In some examples, the inner layer of glass 102 has a lower strength or hardness than the outer layer of glass 101. In some examples, the inner layer of glass 102 has a different chemical composition than the outer layer of glass 101. It should be further understood that the inner layer of glass 102 may include one or more layers or laminations.

The holes 103 of the inner layer of glass 102 may be created using any acceptable method of perforating glass. In some examples, the inner layer of glass 102 may be perforated by an ablative process that precisely drills holes 103 in the glass. In other examples, the inner layer of glass 102 may be perforated with holes 103 by using laser etching. In some examples, after the holes 103 are created in inner layer of glass 102 a fusing or polishing process may be performed in order to reduce flaws in the edges of the glass and provide a suitable edge finish. Processing the inner layer of glass 102 in this manner reduces the chances that the glass will fail over time where the holes 103 have been created.

The outer layer of glass 101 and the inner layer of glass 102 are separated by a gap 104. The gap 104 is, e.g., between 0.5 mm and 6 mm thick. The gap 104 provides an insulating layer of air between the outer layer of glass 101 and the inner layer of glass 102 that facilitates air flow throughout the vehicle and reduces the temperature increase in the area directly affected by the window. In some examples, the insulating layer of air in the gap 104 and the resultant air flow may further provide for temperature regulation of the entire interior of the vehicle, in addition to the area directly affected by the window. In some examples, the gap 104 is connected to a HVAC system 105 of a vehicle, allowing for further temperature control by manipulating the amount and temperature of air flow through the gap. For example, an output of an HVAC system 105 may be coupled to the gap 104 at one or more locations of the glass structure to direct cool/hot air into the gap, which will then exit the gap via holes 103 into the passenger cabin.

In some examples, gap 104 is a non-uniform width. For example, the gap 104 may be thinner or thicker in some areas based on the desired characteristics of the glass system as a whole. In some examples, the uniformity of gap 104 is controlled by varying the thickness of inner layer of glass 102 or outer layer of glass 101. For example, inner layer of glass 102 or outer layer of glass 101 may be substantially wedge shaped and thus be thicker or thinner at certain points of the structure. In some examples, the uniformity of gap 104 is controlled by the design of the frame in which inner layer of glass 102 and outer layer of glass 101 may sit or the vehicle structure in which glass structure 100 is incorporated. In some examples, the uniformity of gap 104 is controlled by varying the size of spacers or other objects used to create the gap.

The frequency of the noise that is absorbed by the glass structure is influenced by the thickness of the inner layer of glass 102, the size of the air gap 104 between the inner layer of glass 102 and the outer layer of glass 101, the diameter of the holes 103, and the porosity of the inner layer of glass 102. Accordingly, the glass structure may be tuned to absorb a specific frequency (or range of frequencies) of noise by adjusting each of those variables. In this way the absorption may be targeted at noise that will affect the specific vehicle the glass structure is installed in. For example, for a vehicle that is lower to the ground noise of the vehicle moving on pavement may be higher than for a vehicle that is higher off the ground. In this instance the vehicle lower to the ground may have the glass structure tuned to absorb the noise of the vehicle moving on pavement, while the vehicle higher off the ground may not.

Different absorption characteristics of the glass structure can be influenced by changing specific physical characteristics of the structure. For example, by increasing the diameter of the holes the peak absorption of the structure shifts to a lower frequency and the peak amplitude decreases. Similarly, by increasing the thickness of the inner layer of glass the peak absorption shifts to a lower frequency and the peak amplitude decreases. Increasing the thickness of the inner layer of glass also causes the absorption to focus on a narrower frequency band, while decreasing the thickness of the inner layer of glass cause the absorption to occur over a wider frequency band. By increasing the overall porosity of the inner layer of glass, or the hole density, the peak absorption of the glass structure shifts to a higher frequency and the peak amplitude decreases. Increasing the gap between the inner layer of glass and the outer layer of glass causes the peak frequency to shift to a lower frequency and the peak amplitude to increase.

The relationships described above may also be demonstrated through the following equations:

$$\text{Absorption of Glass Structure} = \frac{4r_n}{(1 + r_n)^2 + (x_n)^2}$$

Where the real part of normalized impedance, $$r_n = \frac{32\,\eta t}{\sigma \rho c d^2}\left\{\left(1 + \frac{B^2}{32}\right)^{\frac{1}{2}} + \frac{\sqrt{2}}{8}B\frac{d}{t}\right\}$$

the imaginary part of normalized impedance, $$x_n = \frac{\omega t}{\sigma c}\left\{1 + \left(9 + \frac{B^2}{32}\right)^{-1/2} + 0.85\frac{d}{t}\right\} - \cot\left(\frac{\omega h}{c}\right),$$

and where $B = d\sqrt{\omega\rho/4\eta}$.

In each of these equations, $\rho$ is the density of air equivalent to 1.2 kg/m$^3$, c is the speed of sound equivalent to 340 m/s, d is the diameter of the holes, t is the thickness of the inner layer of glass, $\sigma$ is the porosity of the inner layer of glass, $\eta$ is the viscosity of air, $\omega$ is angular frequency, and h is the thickness of the gap. Cot( ) refers to the trigonometric function cotangent.

The gap 104 increases the temperature control by facilitating heat transfer throughout the air gap and the vehicle as a whole, rather than the temperature of a specific area increasing due to the increased sunlight allowed through the glass structure. Facilitating heat transfer in this way may further allow for less use of the HVAC system to manage the temperature, increasing the fuel efficiency or battery life of the vehicle. This is true even in cases in which the HVAC system is connected to the gap because the HVAC system will still be used less and be more efficient than if no gap existed in the glass structure.

It should further be understood that glass structure 100 may include a framing member to fix inner glass layer 102 and outer glass layer 101 as described, e.g., with a gap there between. For instance, inner glass layer 102 and outer glass layer 101 may fit into guides or slots of a metal frame with a desired gap there between. Additionally, at the edges (or periodically across the opposing surfaces) of inner glass layer 102 and outer glass layer 101 spacers may be disposed to maintain the desired gap 104.

Figure 2:
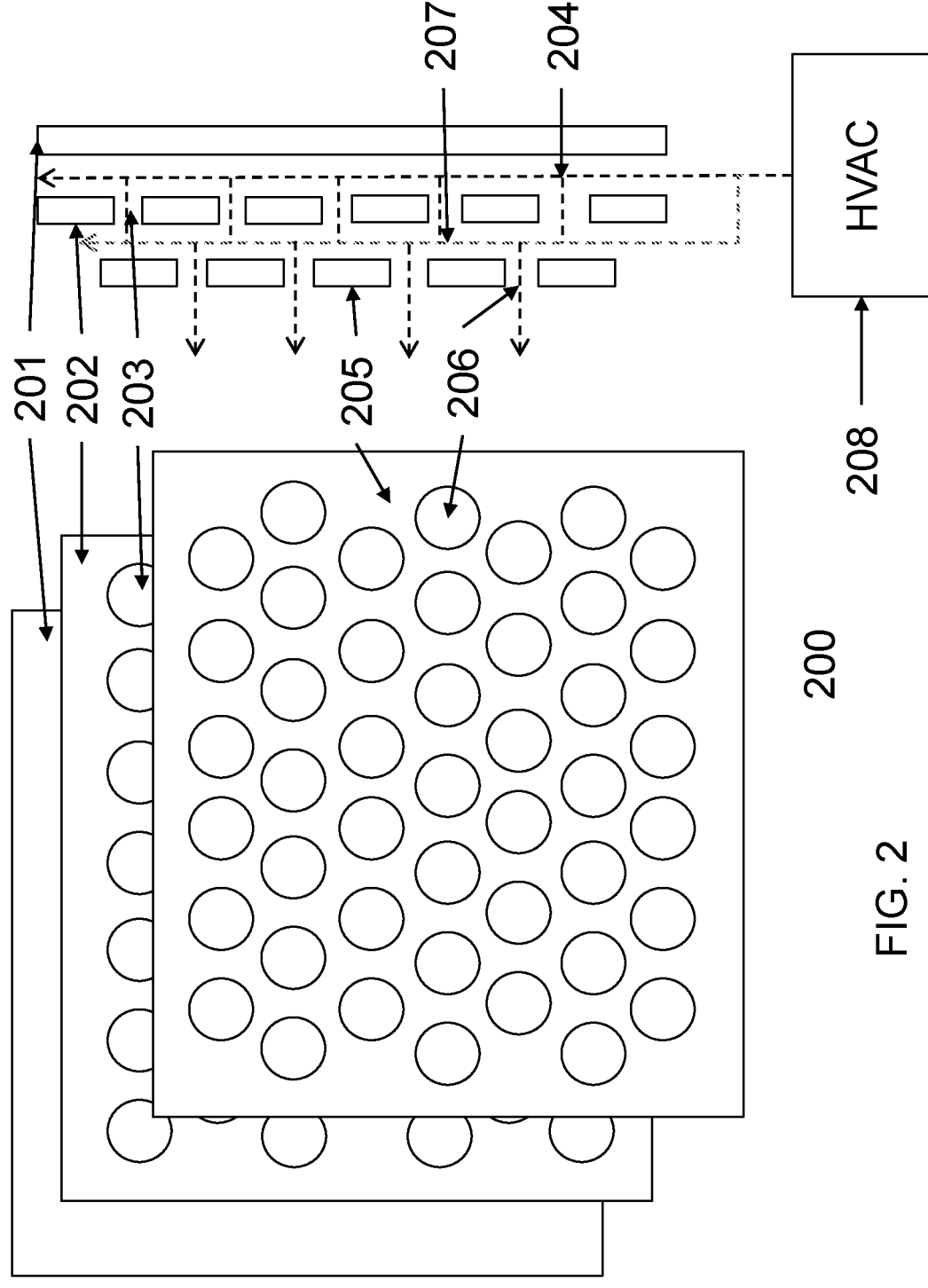
FIG. 2 illustrates an example of the perforated glass structure according to some embodiments.

FIG. 2 illustrates an example of perforated glass structure 200 according to some embodiments, illustrating an exploded view and side view of glass structure 200. The glass structure 200 includes an outer layer of glass 201 and two inner layers of glass 202 and 205. The outer layer of glass 201 may be any type of glass suitable for use in a vehicle. For example, the outer layer of glass 101 may comprise typical glass used in the windshields of vehicles. The outer layer of glass 201 may be shatterproof, shatter resistant, or chemically treated to provide increased hardness. The outer layer of glass 201 may also be of any feasible thickness, for example, between 0.55 mm to 5 mm. The outer layer of glass 201 may be substantially the same as outer layer of glass 101, described with relation to FIG. 1. Similarly, the inner layer of glass 202 may be substantially the same as inner layer of glass 102, described with relation to FIG. 1.

The first inner layer of glass 202 is perforated by a first set of holes 203 and the second inner layer of glass 205 is perforated by a second set of holes 206. Each inner layer of glass is between 0.55 mm and 5 mm thick and has a porosity between 1% and 6% due to the perforated holes 203 and 206. The first set of holes 203 and the second set of holes 206 are circular in shape and are uniformly distributed across the first inner layer of glass 202 and the second inner layer of glass 205, respectively. In some examples, the first set of holes 203 and the second set of holes 206 are shapes other than a circle. For example, the first set of holes 203 and the second set of holes 206 may be a square, a rectangle, a trapezoid, or any other conceivable shape. In some examples, the first set of holes 203 and the second set of holes 206 are not the same size and/or shape. For example, the first set of holes 203 may be circles and the second set of holes 206 may be rectangles. In some examples, the first set of holes 203 or the second set of holes 206 may be comprised of multiple shapes. For example, half of the first set of holes 203 may be circles and the other half may be rectangles.

The first set of holes 203 is distributed uniformly across the first inner layer of glass 202 differently than the uniform distribution of the second set of holes 206 across the second inner layer of glass 205. In this example, the first set of holes 203 and the second set of holes 206 are staggered, such that neither set of holes overlaps the other completely. In some examples, the first set of holes 203 and the second set of holes 206 are distributed such that they do not overlap at all. In some examples, the first set of holes 203 and the second set of holes 206 are not evenly distributed across the first inner layer of glass 202 and the second inner layer of glass 205, respectively. For example, the first set of holes 203 may be located on the edges of the first inner layer of glass 202 and the second set of holes 206 may be located in the center of the second inner layer of glass 205 or vice versa.

In some examples, inner layer of glass 202 is a different thickness than inner layer of glass 205. For example, inner layer of glass 205 may be thinner than inner layer of glass 202 in order to absorb a different frequency than inner layer of glass 202. In some examples, inner layer of glass 202 and inner layer of glass 205 have substantially the same chemical composition, strength, or hardness. In some examples, inner layers of glass 202 and 205 have substantially the same chemical composition, strength, or hardness as outer layer of glass 201. In some examples, inner layers of glass 202 and 205 have substantially different chemical composition, strength, or hardness as outer layer of glass 201.

The outer layer of glass 201 is separated from the first inner layer of glass 202 by a gap 204. Similarly, the first inner layer of glass 202 is separated from the second inner layer of glass 205 by a gap 207. Each of the gaps 204 and 207 are between 0.5 mm and 6 mm thick. In some examples, the gaps 204 and 207 are of a different thickness. The gap 204 provides an insulating layer of air between the outer layer of glass 201 and the first inner layer of glass 202 that facilitates air flow throughout the vehicle and reduces the temperature increase in the area directly affected by the structure. Similarly, the gap 207 provides an additional insulating layer that can increase the temperature management properties of the glass structure 200 as a whole.

In some examples, either gap 204 or 207 is connected to a HVAC system 208 of a vehicle, allowing for further temperature control by manipulating the amount and temperature of air flow through the gap. In some examples, both of the gaps 204 and 207 may be connected to the HVAC system 208 of the vehicle for further control and increased efficiency. As in the previously discussed example, the gap not only allows for increased temperature control, but may also lead to increased fuel efficiency and battery life of the vehicle due to the more uniform temperature of the interior of the vehicle.

In some examples, glass structure 200 includes more than two inner layers of glass. In such examples, the additional inner layers of glass are substantially similar to the first inner layer of glass 202 and second inner layer of glass 205. Each additional inner layer of glass is separated from the preceding one by a gap that is substantially similar to gaps 204 and 207. Incorporating more inner layers of glass in this manner can further improve the noise absorption and temperature of the glass structure. In particular adding multiple inner layers can increase the frequency range of noise that is absorbed by the glass structure 200. This is accomplished by tuning each inner layer of glass to a specific frequency of noise so that a wider spectrum of noises may be absorbed.

Figure 3:
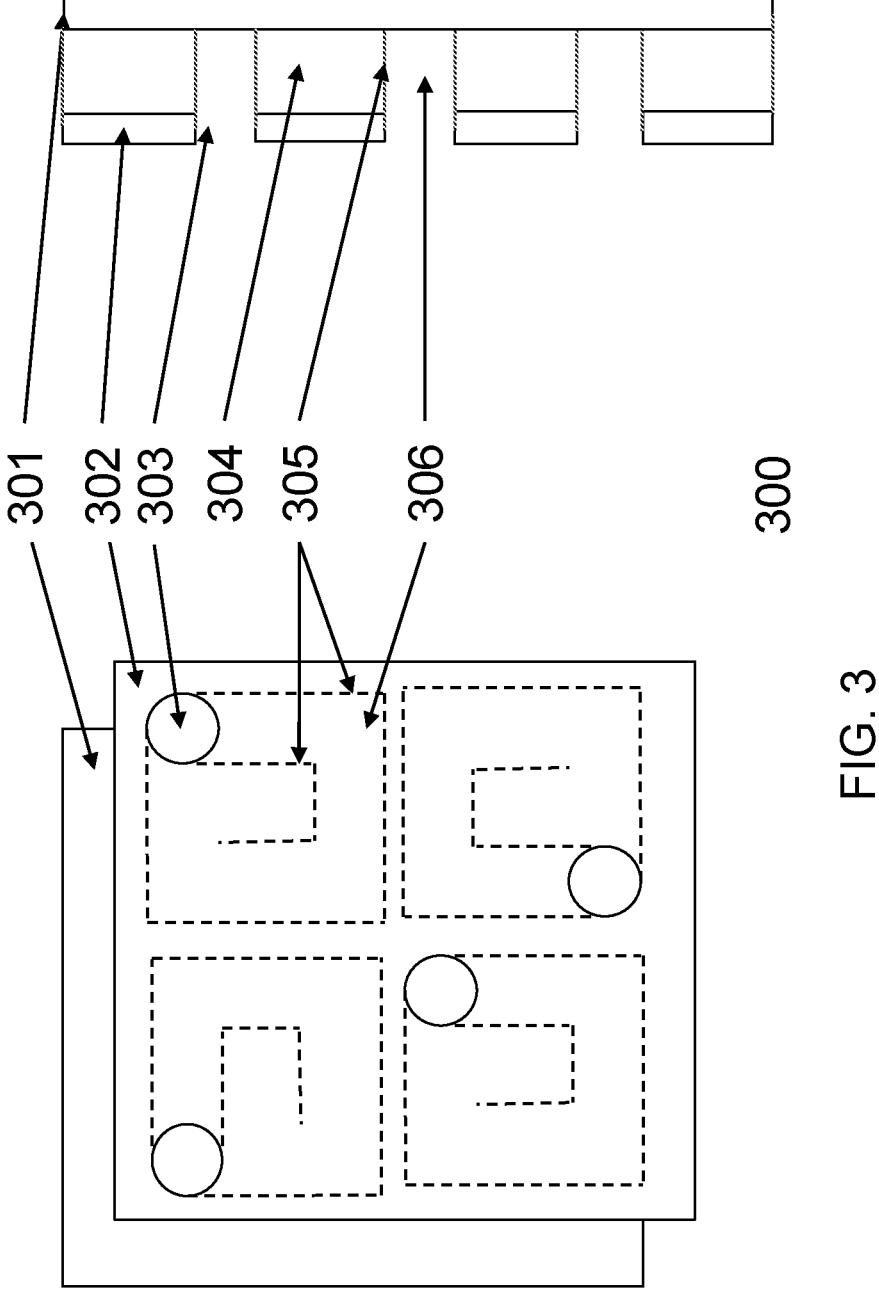
FIG. 3 illustrates an example of the perforated glass structure according to some embodiments.

FIG. 3 illustrates an example of perforated glass structure 300 according to some embodiments, illustrating an exploded view and side view of glass structure 300. Glass structure 300 is substantially similar to glass structure's 100 and 200 of the examples previously discussed. Glass structure 300 further includes walls 305 disposed in the gap 304 between the outer layer of glass 301 and the inner layer of glass 302. In some examples, walls 305 are connected to one or both of outer layer of glass 301 and inner layer of glass 302. The walls 305 create channels 306 in the gap 304 around the holes 303. The walls of 305 are arranged so that channels 306 are substantially spiral in shape. Creating channels 306 in this way may shift the resonance absorption peak to a lower frequency, changing the type of noise that is absorbed by the glass structure 300. In some examples, the walls 305 are made of glass, for example the same type of glass that is used to make inner layer of glass 302. In some examples, the walls 305 are made of a material other than glass, for example plastic, metal, cloth, or any other suitable material. In some examples, the glass structure 300 may include additional inner layers of glass and walls connecting each layer of glass to the one before it. In some examples with additional inner layers of glass, the walls create channels of the same shape for each layer. In some examples with additional inner layers of glass, the walls create channels of different shapes for each layer.

In some examples, walls 305 form a plurality of discrete cells within gap 304, separated from adjacent cells or spaces within gap 304 by structure of the walls 305. In other examples, the walls 305 leave one or more openings between adjacent structures such that, e.g., air can be directed through gap 304 to the different cells from an HVAC system or the like.

Figure 4:
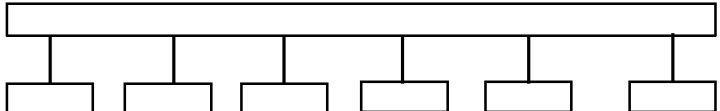
FIG. 4 illustrates an example of the perforated glass structure according to some embodiments.
Figure 4:
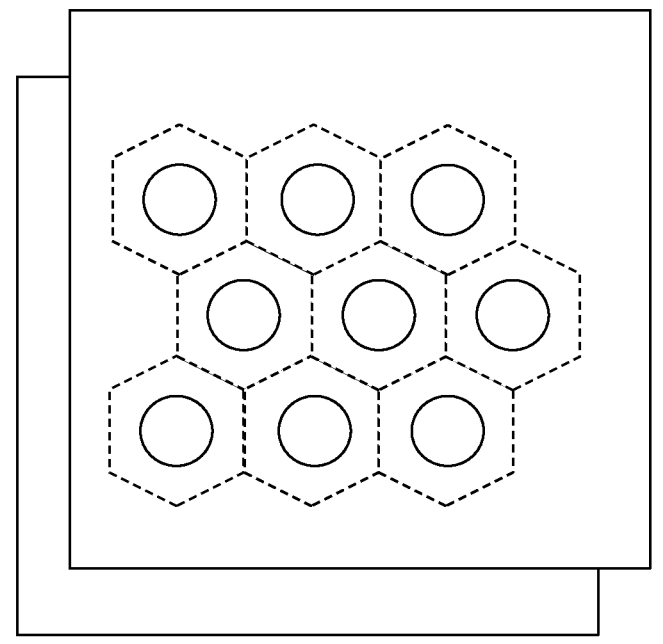

FIG. 4 illustrates an example of perforated glass structure 300 in which the walls are arranged so that the channels are substantially hexagonal in shape or make a honeycomb pattern, changing the acoustic performance of the glass structure. In some examples, the walls are arranged so that the channels are square shaped. The walls may be arranged so that the channel is any other feasible shape (e.g., triangles, parallelograms, trapezoids, etc.).

One of skill in the art will recognize that the glass structures described herein may be used in a number of ways in vehicles to create surfaces that allow for greater acoustic performance and temperature management. In this way the interior of a vehicle may be exposed to more natural light, resulting in an environment that occupants find more natural and welcoming. Thus, a vehicle occupants enjoyment of the space may be increased.

In some examples, a glass structure (e.g., 100) includes an outer layer of glass (e.g, 101) and an inner layer of glass (e.g., 102), the inner layer of glass being perforated by a plurality of holes (e.g., 103). In some examples, the outer layer of glass and the inner layer of glass are separated by a gap (e.g., 104) disposed between opposing surfaces of the outer layer of glass and the inner layer of glass. In some examples, the gap is between 0.5 mm and 6 mm. In some examples, each of the plurality of holes is a circle. In some examples, the plurality of holes are tuned to a frequency. In some examples, the plurality of holes are uniformly distributed across the inner layer of glass. In some examples, the plurality of holes are distributed around the edges of the inner layer of glass. In some examples, the inner layer of glass is thinner than the outer layer of glass. In some examples the outer layer of glass has a higher strength than the inner layer of glass. In some examples, the chemical composition of the outer layer of glass and the inner layer of glass are the same.

In some examples, the inner layer of glass is a first inner layer of glass (e.g., 202) and the glass structure further includes a second inner layer of glass (e.g., 205). In some examples, the first inner layer of glass and the second inner layer of glass are separated by a gap (e.g., 207) disposed between opposing surfaces of the first inner layer of glass and the second inner layer of glass. In some examples, the plurality of holes is a first plurality of holes (e.g., holes 203) and the second inner layer of glass is perforated by a second plurality of holes (e.g., holes 206). In some examples, the second plurality of holes are distributed differently from the first plurality of holes. In some examples, the second plurality of holes and the first plurality of holes are staggered. In some examples, the first plurality of holes and the second plurality of holes are tuned to different frequencies. In some examples, air flow occurs through the gap.

In some examples, the inner layer of glass (e.g., 302) and the outer layer of glass (e.g., 301) are connected by a plurality of walls (e.g., 305). In some examples, the plurality of walls creates a channel (e.g., 306) in the gap between the outer layer of glass and the inner layer of glass. In some examples, the channel is shaped like a spiral.

The foregoing disclosure is not intended to limit the present disclosure to the precise forms or particular fields of use disclosed. As such, it is contemplated that various alternative embodiments and/or modification to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the glass structure. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A structure for a vehicle, the structure comprising:
an outer layer of glass having an outer layer thickness, wherein the outer layer is a solid layer of glass; and
an inner layer of glass comprising:
a first inner layer, wherein the first inner layer has a first inner layer thickness; and
a second inner layer, wherein the second inner layer has a second inner layer thickness;
a plurality of discrete cells disposed between the inner layer of glass and the outer layer of glass, the plurality of discrete cells being hexagonal in shape and comprise a plurality of glass walls that extend from the inner layer of glass to the outer layer of glass to form a gap between the inner layer of glass and the outer layer of glass, the gap comprising a non-uniform width between the inner layer of glass and the outer layer of glass;

wherein the first inner layer and the second inner layer are separated by an inner layer gap disposed between opposing surfaces of the first inner layer and the second inner layer; and wherein the inner layer of glass is perforated by a plurality of holes that comprise a first plurality of holes arranged along the first inner layer and a second plurality of holes arranged along the second inner layer; and an HVAC coupling that directs airflow from an HVAC of the vehicle into the gap between the inner layer of glass and the outer layer of glass and through the plurality of holes distributed within the plurality of discrete cells on the inner layer of glass.

2. The structure of claim 1, wherein each hole of the plurality of holes is a circle.

3. The structure of claim 1, wherein the first inner layer thickness is less than the second inner layer thickness.

4. The structure of claim 1, wherein the inner layer of glass has a higher strength than the outer layer of glass.

5. The structure of claim 1, wherein a chemical composition of the outer layer of glass and the inner layer of glass are the same.

6. The structure of claim 1, wherein the first plurality of holes and the second plurality of holes vary in one or more of size, density, or shape.

7. The structure of claim 1, wherein an entrance to each cell among the plurality of discrete cells is a hole from among the plurality of holes in the inner layer of glass.

8. The structure of claim 1, wherein the first set of the plurality of holes and the second set of the plurality of holes do not overlap.

9. The structure of claim 1, wherein at least two of the first inner layer thickness, the second inner layer thickness, the gap width, the hole diameters, and the hole density are selected relative to each other to tune the glass structure to absorb a specific frequency of noise.

10. The structure of claim 1, wherein the first inner layer thickness and the second inner layer thickness are different, and the first plurality of holes and the second plurality of holes have different diameters.

11. The structure of claim 1, wherein the gap has a width between 0.5 mm and 6 mm, the plurality of holes have diameters ranging from 0.05 mm to 2 mm, and the hole density varies between the first inner layer and the second inner layer.

12. The structure of claim 1, wherein the first inner layer has a first thickness and first hole configuration, and the second inner layer has a different second thickness and different second hole configuration.

* * * * *